(12) United States Patent
He et al.

(10) Patent No.: US 11,269,576 B2
(45) Date of Patent: Mar. 8, 2022

(54) DETERMINING VARIATIONS OF CONTENT TO PROVIDE TO USERS IN VARIATION TESTING OF CONTENT

(71) Applicant: Optimizely, Inc., San Francisco, CA (US)

(72) Inventors: Meng Xiao He, Cambridge, MA (US); Tyler Brandt, Alameda, CA (US); Richard Klafter, Berkeley, CA (US); Jonathan Dobbie, Berkeley, CA (US); Ajith Arthur Mascarenhas, Berkeley, CA (US); Chrix Erik Finne, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 861 days.

(21) Appl. No.: 14/823,643

(22) Filed: Aug. 11, 2015

(65) Prior Publication Data

US 2017/0046110 A1  Feb. 16, 2017

(51) Int. Cl.
| | | |
|---|---|---|
| *G06F 3/14* | (2006.01) | |
| *H04L 67/02* | (2022.01) | |
| *G06F 8/38* | (2018.01) | |
| *G06F 40/197* | (2020.01) | |
| *G06F 9/451* | (2018.01) | |

(52) U.S. Cl.
CPC .............. *G06F 3/1415* (2013.01); *G06F 3/14* (2013.01); *G06F 8/38* (2013.01); *G06F 40/197* (2020.01); *H04L 67/02* (2013.01); *G06F 9/451* (2018.02); *G09G 2354/00* (2013.01); *G09G 2370/027* (2013.01)

(58) Field of Classification Search
CPC ........ G06F 3/1415; G06F 40/197; G06F 3/14; G06F 8/38; G06F 9/451; H04L 67/02; G09G 2354/00; G09G 2370/027
See application file for complete search history.

(56) References Cited

U.S. PATENT DOCUMENTS

| | | |
|---|---|---|
| 5,933,811 A | 8/1999 | Angles |
| 7,895,293 B1 | 2/2011 | Vasilik |
| 8,296,643 B1 | 10/2012 | Vasilik |
| 8,543,900 B1 | 9/2013 | Kent |
| 8,850,305 B1 | 9/2014 | Kent |
| 8,898,560 B1 | 11/2014 | Kent |
| 2002/0078141 A1 | 6/2002 | Cohen |
| 2005/0120290 A1 | 6/2005 | Mistry et al. |
| 2005/0125722 A1 | 6/2005 | Mistry et al. |

(Continued)

OTHER PUBLICATIONS

Office Action for U.S. Appl. No. 13/345,211, filed Oct. 30, 2013, 21 Pages.

(Continued)

*Primary Examiner* — Jennifer N Welch
*Assistant Examiner* — Amy P Hoang
(74) *Attorney, Agent, or Firm* — Womble Bond Dickinson (US) LLP

(57) ABSTRACT

A variation testing system environment for performing variation testing of web pages and applications is disclosed. Users requesting a view from a content provider are not randomly assigned to one of a plurality of variations of the view. Rather, a function is applied to each user's identifier in order to determine which variation of the view is provided to a client device of the user.

19 Claims, 8 Drawing Sheets

(56) References Cited

U.S. PATENT DOCUMENTS

| | | |
|---|---|---|
| 2005/0229101 A1 | 10/2005 | Matveyenko et al. |
| 2006/0162071 A1 | 7/2006 | Dixon |
| 2007/0271352 A1 | 11/2007 | Khopkar et al. |
| 2008/0140765 A1 | 6/2008 | Kelaita |
| 2008/0189156 A1 | 8/2008 | Voda et al. |
| 2008/0249855 A1 | 10/2008 | Collins et al. |
| 2008/0275980 A1 | 11/2008 | Hansen |
| 2008/0320225 A1 | 12/2008 | Panzer |
| 2009/0030859 A1 | 1/2009 | Buchs et al. |
| 2009/0183084 A1 | 7/2009 | Robertson |
| 2009/0282343 A1 | 11/2009 | Catlin et al. |
| 2010/0037150 A1 | 2/2010 | Sawant |
| 2010/0064281 A1 | 3/2010 | Kimball et al. |
| 2010/0070876 A1 | 3/2010 | Jain et al. |
| 2010/0312810 A1 | 12/2010 | Horton et al. |
| 2011/0161825 A1 | 6/2011 | Tierney |
| 2014/0189714 A1* | 7/2014 | Lawbaugh .......... H04L 41/0253 719/313 |
| 2014/0278747 A1* | 9/2014 | Gumm ............... G06Q 30/0201 705/7.29 |

OTHER PUBLICATIONS

Office Action for U.S. Appl. No. 13/345,211, filed Feb. 13, 2014, 36 Pages.

"Web site," Microsoft Computer Dictionary, May 1, 2002, p. 710, Microsoft Press, Fifth Edition, can be retrieved at <URL:http://academic.safaribooksonline.com/book/communications/0735614954>.

\* cited by examiner

DETERMINING VARIATIONS OF CONTENT TO PROVIDE TO USERS IN VARIATION TESTING OF CONTENT

FIELD OF TECHNOLOGY

The embodiments described herein pertain in general to conducting controlled, randomized experiments and more particularly to determining which version of content undergoing an experiment to display to users.

BACKGROUND

Content variation testing is an experiment that tests changes to content against a current version of the content. One example of content variation testing is web page variation testing where an experiment is conducted that tests changes to a web page against another design of the web page. During variation testing of a web page, changes to a web page that produce positive results are determined. The positive results associated with a particular change to a web page validates that the change to the web page should be used in a production version of the web page.

In conventional variation testing, when a user requests a web page from a website, the website may determine rules associated with variation test for the web page. For example, the rules may specify that one thousand users view a first version of a web page whereas another thousand users view a second version of the web page. When a user request a web page, the user may be randomly assigned to either the first version of the web page or the second version of the web page according to the rules. However, conventional variation testing techniques result in a user seeing different versions of a web page when the user uses different devices or web browsers to view the web page. This degrades the user's experience as the user experiences inconsistency when visiting the web page using different devices or web browsers.

BRIEF SUMMARY

The embodiments herein describe a variation testing system environment for performing variation testing of a web page. Users requesting a web page from a content provider are not randomly assigned to one of a plurality of variations of the web page. In one embodiment, each user's identifier is used as a basis for determining which version of the web page is provided to a client device of the user. Each user identifier is input into a hash function to generate an assignment identifier based on the user identifier. According to the value of each assignment identifier, a variation of the web page is selected and the selected variation of the web page is provided to each user based on the assignment identifier. As long as a given user maintains the same user identifier, the user will receive the same variation of the web page during visits to the web page using different client devices or web browsers.

Features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
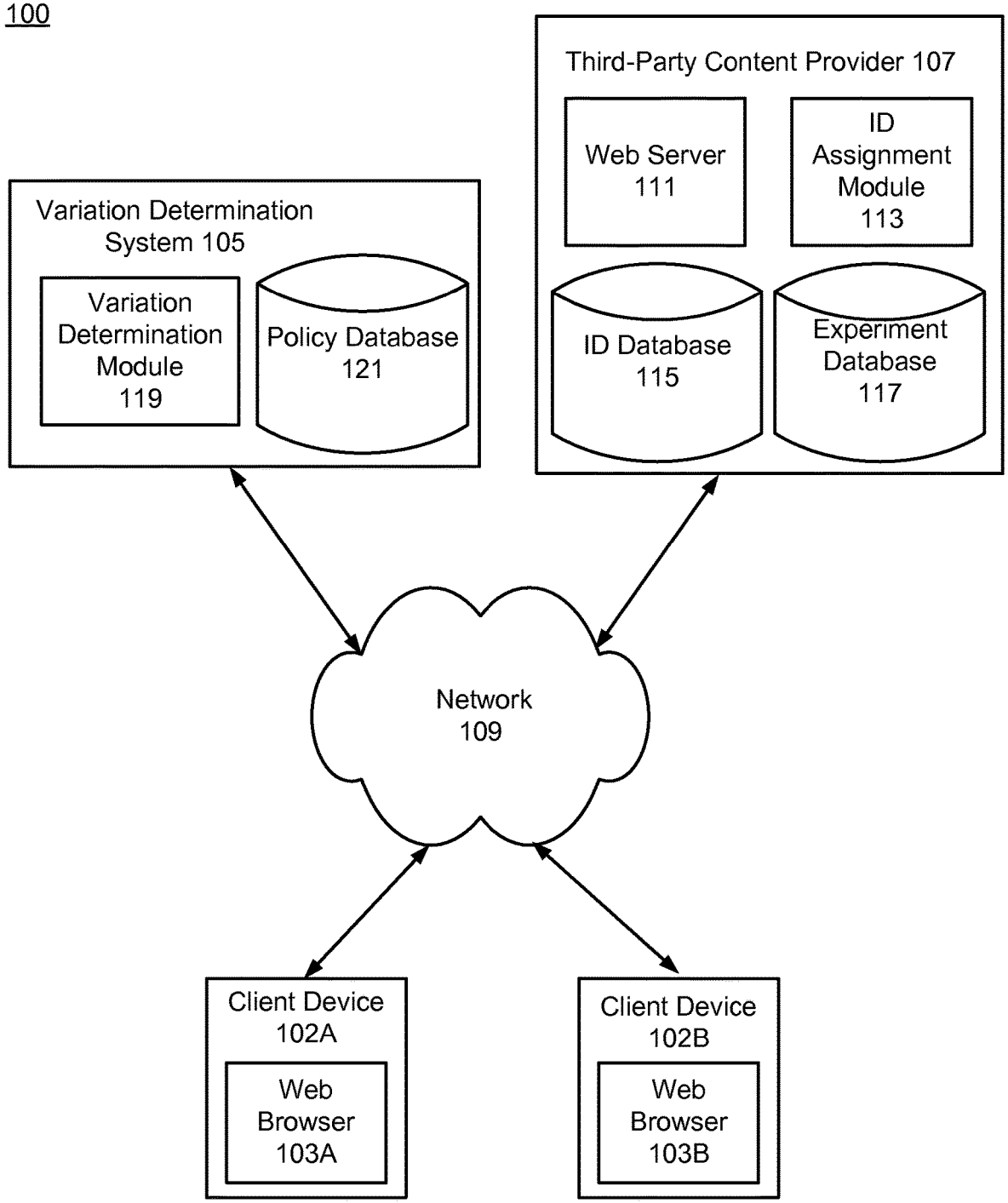
FIG. 1 is a block diagram of a variant testing system environment according to one embodiment.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to a variation determination system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the variation determination system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 include web pages. However, the content provider 107 may provide other types of content items such as video, audio, a combination of video and audio, still images (e.g., JPEG), text documents, advertisements, and/or any other types of content. For purposes of convenience and the description of one embodiment, the content items provided by the content provider 107 will be referred to as a web pages, but no limitation on the type of content items are intended by this terminology.

In one embodiment, the content provider 107 operates in conjunction with the variation determination system 105 to perform variation testing on web pages. The content provider 107 may display different variations of a web page to client devices 102 based on instructions from the variation determination system 105 that is conducting a variation test on the web page for the content provider 107. A variation test for a web page tests changes to the web page against the current variation of the web page to determine whether the changes produce a desired result. An example of a desired result resulting from a change to a web page is an increased selection of an advertisement(s) included in the web page or increased purchases of a product advertised on a web page. Thus, variation testing validates a new design of a web page or changes on elements on the web page before the new design or changes are put into production by the content provider 107.

For a given web page, the content provider 107 may have one or more variations of the web page that are used in a variation test for the web page. In one embodiment, a variation test of a web page involves an experiment that tests an "A" variation known as the control and a "B" variation known as the variant on users requesting the web page from the content provider 107. For ease of discussion, the embodiments discussed herein describe a web page having only two variations: the control and the variant. However, in other embodiments, a web page can have any number of variants.

Figure 2B:
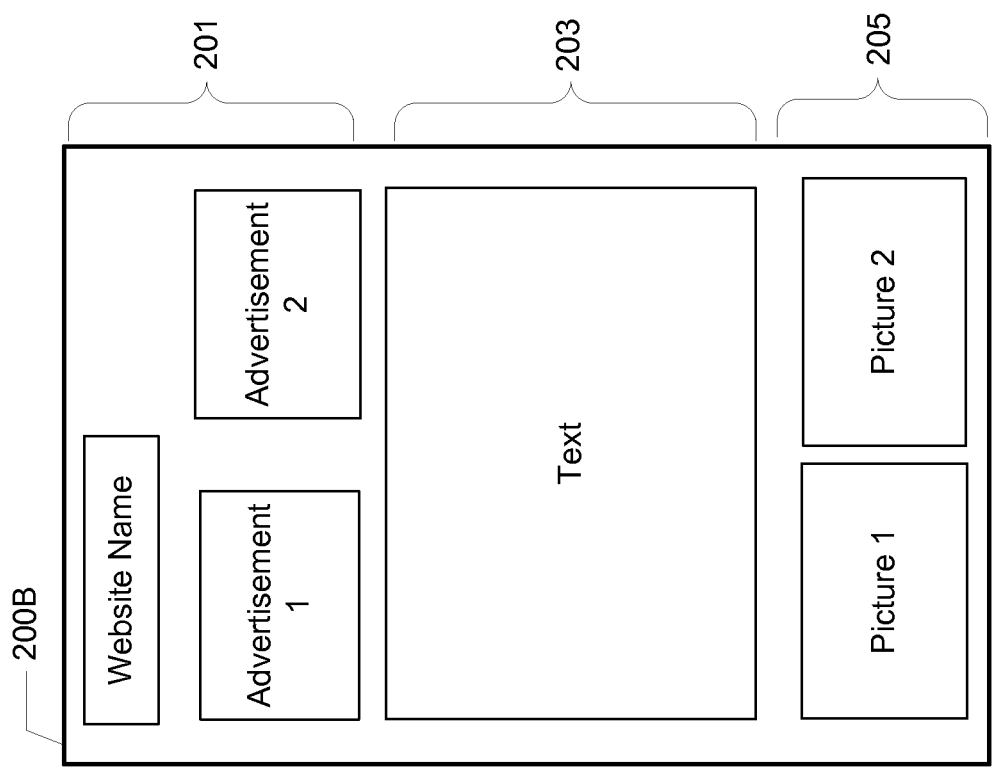
FIGS. 2A and 2B are example variations of a web page according to one embodiment.
Figure 2A:
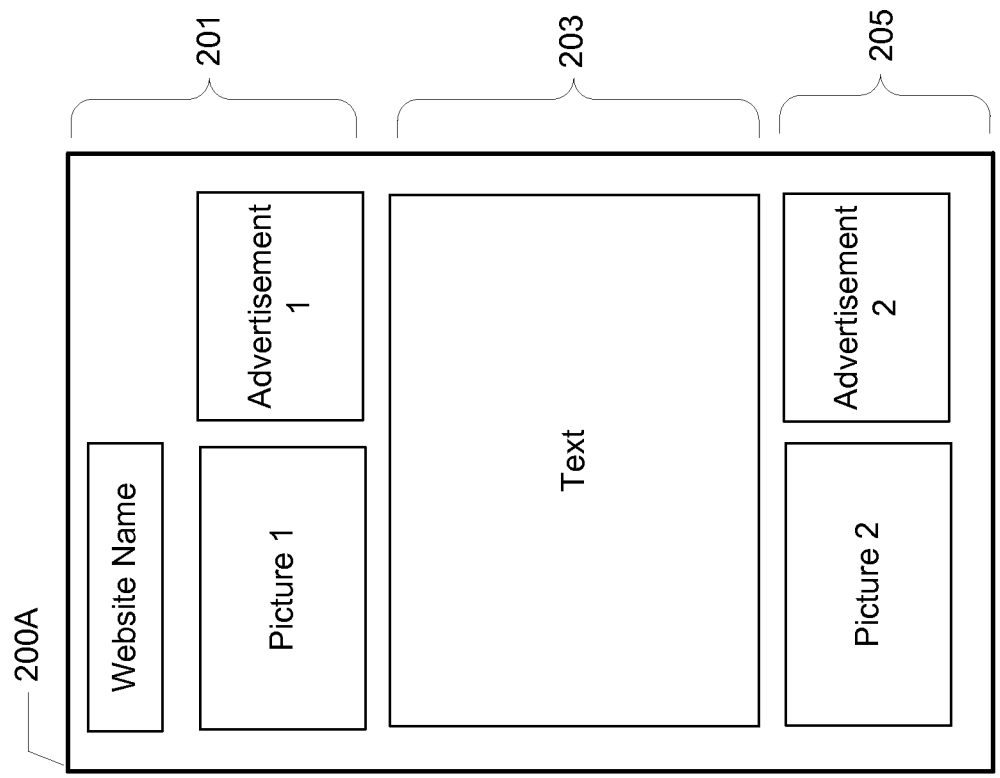

FIG. 2A is an example of an "A" variation (e.g., the control variation) of a web page 200A that represents the current implementation of the web page provided by content provider 107. The control variation of the web page 200A includes a website name of the website associated with the web page, a first picture, and a first advertisement. The website name, the first picture, and the first advertisement are located in an upper portion 201 of the control variation of web page 200A according to one embodiment. The control variation of web page 200A also includes textual content located in a central portion 203 of the control variation of web page 200A and the control variation of the web page 200A also includes a second picture and a second advertisement located at a lower portion 205 of the control variation of the web page 200A.

FIG. 2B is an example of a "B" variation (e.g., the variant version) of a web page 200B. The variant version of the web page represented by web page 200B includes a change (i.e., a modification) to the control version of the web page 200A shown in FIG. 2A. The variant version of web page 200B includes the website name, a first advertisement, a second advertisement, textual content, a first picture, and a second picture similar to the control version of the web page 200A shown in FIG. 2A. However, the variant version of web page 200B includes the second advertisement positioned in the upper portion 201 of web page 200B whereas the second advertisement is positioned in the lower portion 205 in the control version of the web page 200A. In one embodiment, the variation test using the control version and the variant version of the web page is conducted to determine whether the second advertisement receives more selections when the second advertisement is located at the lower portion 205 of the web page as shown in FIG. 2A or when the second advertisement is located at the upper portion 201 of the web page as shown in FIG. 2B.

Referring back to FIG. 1, in one embodiment the content provider 107 includes a web server 111, an identification (ID) assignment module 113, an ID database 115, and an experiment database 117. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the content provider 107 shown in FIG. 1 can have different and/or other modules than the ones described here, and that the functionalities can be distributed among the modules in a different manner.

In one embodiment, the experiment database 117 stores multiple (i.e., a plurality) variation testing records that describe variation tests conducted by the variation determination system 105. Each variation test record is associated with a web page, an experiment identifier unique to the variation test, and identifiers of different variations of a web page involved in the variation test. A variation test record may also include a description of the change(s) made to each variation of the web page compared to the control variation of the web page.

In one embodiment, the web server 109 links the content provider 107 to one or more client devices 102 and the variation determination system 105 via the network 109. The web server 111 serves content items such as web pages, as well as other web related content, such as Java, Flash, XML, and so forth. The web server 111 may include a mail server or other messaging functionality for receiving and routing messages between the variation determination system 105 and one or more client devices 102.

The identification (ID) assignment module 113 generates user identifiers for users of client devices 102. In one embodiment, the user identifier is used by the user of a client device 102 to log into a web page or application provided by the content provider 107. In one embodiment, a user identifier is a string of numbers that is unique to a particular client device 102. Thus, client device 102A may have a different user identifier than the user identifier for client device 102B. In one embodiment, the ID assignment module 113 generates a user identifier by automatically incrementing the value of the last user identifier generated by the ID assignment module 113 using an auto increment function. Alternatively, the ID assignment module 113 generates a unique random number and assigns the unique random number as a user identifier for a client device 102. In another embodiment, the ID assignment module 113 may receive a user identifier from a client device 102. The user identifier received from the client device 102 may be generated by the client device 102 or the user identifier may be input by the user into the client device 102. The ID assignment module 113 stores user identifiers in the ID database 115 that maintains a record of all assigned user identifiers.

In one embodiment, responsive to the content provider 107 receiving a request for a web page from a client device, the ID assignment module 113 communicates with the client device 102 to determine whether the client device 102 already has a user identifier. For example, the ID assignment module 113 may query the client device 102 to transmit the user identifier via a login form displayed on the web page. In another example, the ID assignment module 113 queries the client device 102 to determine whether the client device 102 includes a stored cookie that comprises a user identifier for the client device 102. If the client device 102 lacks a cookie with a user identifier for the client device 102, the ID assignment module 113 may query the client device 102 to transmit the user identifier via a login form displayed on the web page. Alternatively, the ID assignment module 113 generates a user identifier for the client device 102 and communicates the user identifier to the client device 102 for storage in a cookie at the client device 102 if the client device 102 lacks a cookie with a user identifier. The client device 102 will continue to use the user identifier generated by the ID assignment module 113 for subsequent requests for the web page.

The variation determination system 105 selects a variation of a web page from a plurality of variations of the web page undergoing a variation test to provide to a client device 102. In one embodiment, the variation determination system 105 includes a variation determination module 119 and a policy database 121. Although the variation determination system 105 only includes a single module as shown in FIG. 1, the variation determination system 105 may include other modules that perform other functionality than that described herein.

The variation determination module 119 receives a request from the content provider 107 to provide instructions indicating which variation of a web page should be provided to a client device 102 that submitted a request for the web page. For example, the variation determination system 105 determines whether to provide the control variation of a web page or the variant variation of the web page to the client 102. The request from the content provider 107 is an indication to the variation determination system 105 that a web page was requested by a client device 102.

In one embodiment, the request transmitted by the content provider 107 includes a user identifier of the client device 102 that requested the web page. Alternatively, the request includes the user identifier of the client device 102 and the experiment identifier for the variation test being performed on the web page requested by the client device 102. In some embodiments, the variation determination system 105 includes an experiment database including records of the variation tests associated with content provider 107 similar to experiment database 117. Thus, the variation determination module 119 may determine the experiment identifier from the experiment database located at the variation determination system 105 rather than rely on the content provider 107 to provide the experiment identifier.

The variation determination module 119 determines which variation of a web page to provide to a client device 102 based on the user identifier of the client device 102 received in the request. In one embodiment, the variation determination module 119 applies a function to the user identifier to generate a hashed user identifier. The hashed user identifier may be an alphanumeric string. For example, if the user identifier is "367" the application of the function to the user identifier results in the hashed user identifier "A12367." Alternatively, the variation determination module 119 applies the function to a value that is based on a concatenation of the user identifier and the experiment identifier for the variation test to generate an obfuscated user identifier. In one embodiment, the value may be a product of the user identifier and experiment identifier, but the value may be calculated by the variation determination module 119 according to other mathematical functions such as summing the user identifier and experiment identifier.

In one embodiment, the function applied by the variation determination module 119 is a deterministic, uniform and pseudorandom number generator such as the MurmurHash3 hash function. The function is deterministic in that given the same user identifier input into the function, the variation determination module 119 calculates the same hashed user identifier for the user identifier. This results in the client devices 102 of the user all receiving the same variation of the web page from the content provider 107 responsive to the client devices 102 requesting the web page. By applying the deterministic, uniform and pseudorandom number generator to the user identifier (or the concatenation of the user identifier and the experiment identifier), users are assigned to a corresponding variation of the web page in a uniform probability distribution that does not undermine the randomness and statistical validity of the variation test due to the uniformity of the function. In some embodiments, unequal assignments are created. For example, a variation test can be designed such that 60 percent of users are assigned to variation A of a web page and 40 percent of users are assigned to variation B of the web page.

In one embodiment, the variation determination module 119 normalizes the hashed user identifier to create an assignment identifier that is the basis for assigning the user to a variation of a web page. Normalizing the hashed user identifier restricts the assignment identifier to a fixed interval such as [0, 1). Since the function is uniform, all potential values output by the function are spread evenly within the fixed interval. As will be further described below, the normalization of the hashed user identifier allows for the specification of specific distributions of the proportion of desired users assigned to each variation of the web page.

To normalize the hashed user identifier, the variation determination module 119 divides the hashed user identifier by the maximum possible value of the hashed user identifier. For example, the output of the function may be represented by a positive 32-bit unsigned integer with a maximum possible value of $2^{32}-1$, or 4,294,967,295. Thus, in one embodiment the assignment identifier for the client device 102 is the quotient of the hashed user identifier and the maximum possible value for the hashed user identifier. In this way, the range of values for the output of the uniform hash function is mapped to the range [0, 1), and can be used to simulate the output of a random number generator within the same range.

The variation determination module 119 determines which variation of a web page to instruct the content provider 107 to provide to a client device 102 of a user. In one embodiment, the variation determination module 119 determines which variation of a web page to instruct to the content provider 107 to provide to a client device 102 based on the assignment identifier for the client device 102. In one embodiment, the variation determination module 119 compares the assignment identifier to a policy for the web page that is stored in the policy database 121.

Each policy stored in the policy database 121 is associated with a corresponding variation test involving a web page and describes which variation of the web page to display based on either the assignment identifier calculated for a client device 102. In one embodiment, a policy for a web page describes a threshold that is used to determine which variation of a web page to instruct the content provider 107 to provide to the client device 102 if the variation test for the web page includes only two variations of the web page: the control and the variant. If the assignment identifier is below the threshold, the variation determination module 119 may instruct the content provider 107 to provide the control variation of the web page to the client device 102, for example. In contrast, if the assignment identifier is above the threshold, the variation determination module 119 may instruct the content provider 107 to provide the variant variation of the web page to the client device 102. In one embodiment, the value of the threshold can be used to change the distribution of users to each variation. For example, if the assignment identifiers are restricted to a range of [0, 1], a threshold value of 0.5 can be used to provide an even distribution of users to either variation A or variation B of a web page. In another example, the threshold value may be 0.6 causing 60 percent of users to be assigned to variation A of the web page and 40 percent of users to be assigned to variation B.

In one embodiment, if a variation test for a web page includes more than two variations of the web page (e.g., one control version and two variant versions), the policy for the variation test may define a mapping between a set of different ranges of assignment identifiers and a corresponding set of variations of the web page. This mapping may be implemented by, for example, a table of different ranges of assignment identifiers and corresponding variations of the web page wherein, the variation determination module 119 selects from a table of assignment identifiers a variation of the web page that corresponds to the assignment identifier for the client device 102.

For example, a policy may describe a first range of assignment identifiers that is associated with a control version of a web page, a second range of assignment identifiers that is associated with a first variant version of the web page, and a third range of assignment identifiers that is associated with a second variant version of the web page. The variation determination module 119 determines whether the assignment identifier or the normalized assignment identifier is included in the first range of assignment identifiers, the second range of assignment identifiers, or the third range of assignment identifiers. The variation determination module 119 then selects the variation of the web page associated with the range of assignment identifiers that includes the assignment identifier or the normalized assignment identifier.

Rather than use a mapping between a set of different ranges of assignment identifiers and a corresponding set of variations of the web page to select which variation of a web page to provide to a client device, in another embodiment, each variation is assigned a weight. The assignment identifier is normalized to a value between the range of zero and the maximum possible weight. The variation corresponding to a given assignment identifier is determined by finding the weight range associated with that variation in which the assignment identifier falls.

Once the variation determination module 119 determines which variation of the web page should be provided to the client device 102, the variation determination module 119 communicates a notification to the content provider 107. The notification instructs the content provider 107 to provide a particular variation of the web page to the client device 102 that requested the web page. Since the user identifier for the user's client devices 102 is used as the input for the function that is the basis for selecting which variation of a web page to provide to the user's client devices 102, the client devices 102 of the user that request the web page will always receive the same variation of the web page. For example, user A's client devices 102A may always receive the control version of the web page whereas user B's client devices 102B may always receive the variant version of the web page.

In one embodiment, the variation determination system 105 receives from the third-party content provide 107 data describing user interactions of web pages by users of client devices 102. The variation determination system 105 may receive the data once a threshold number of users were subject to the variation test for a web page for example. The variation determination system 105 determines from the data the results of the variation test of the web page. For example, the variation determination system 105 determines based on the data whether a higher percentage of users selected the second advertisement located at the upper portion 201 of the variant version of the web page 200B or the second advertisement located at the lower portion 205 of the control version of the web page 200A. Based on the results of the test, the content provider 107 may decide whether to provide only the control version of the web page or promote the variant version of the web page to the control version of the web page thereby replacing the original control version of the web page.

Figure 3:
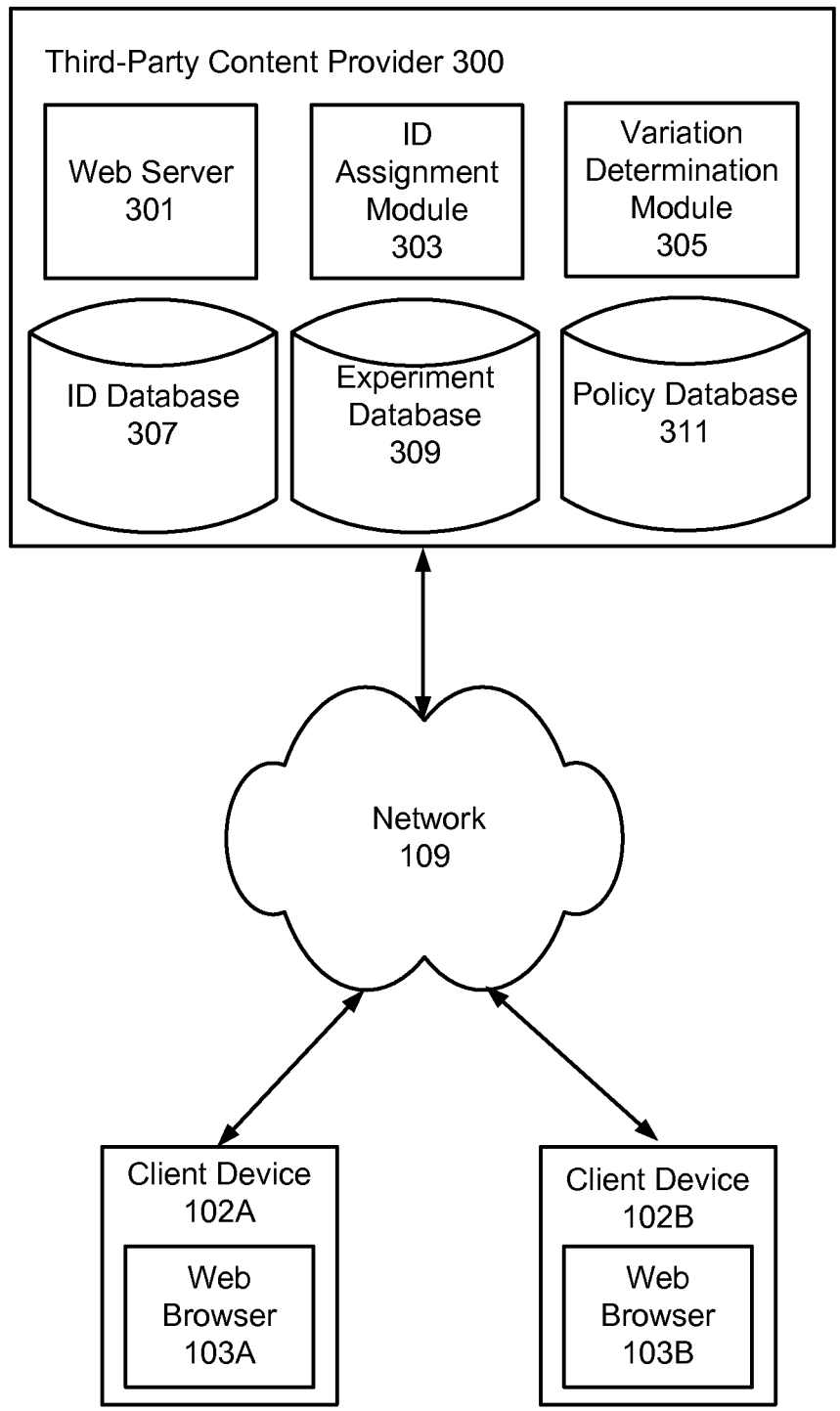
FIG. 3 is a block diagram of a variant testing system environment according to another embodiment.

FIG. 3 is a block diagram of a variant testing system environment 300 according to an alternative embodiment. As shown in FIG. 3, environment 300 includes client devices 102 in communication with a third-party content provider 300 (hereinafter referred to as a "content provider 300") via network 109. In contrast to the embodiment shown in FIG. 1, the content provider 300 includes the functionality of the variation determination system 105 shown in FIG. 1. Thus, the content provider 300 determines which variation of a web page to provide to a client device 103 without consulting an external variation determination system as shown in the embodiment of FIG. 1.

In one embodiment, the content provider 300 includes a web server 301, an ID assignment module 303, a variation determination module 305, an ID database 307, an experiment database 309, and a policy database 311. The components of content provider 300 shown in FIG. 3 perform similar functionality as their respective components described above with respect to FIG. 1 and are omitted for ease of description.

Figure 4:
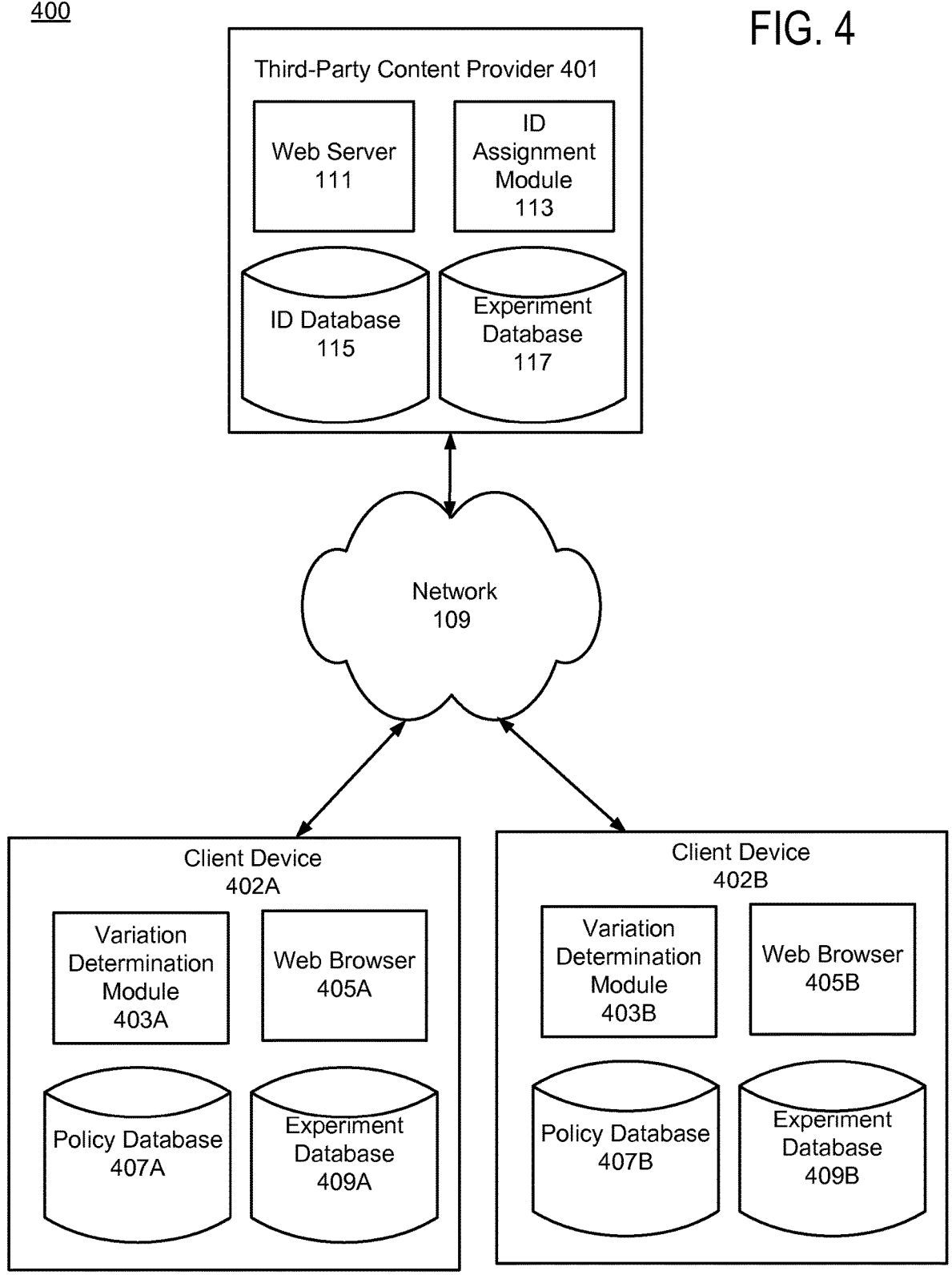
FIG. 4 is a block diagram of a variant testing system environment according to another embodiment.

In alternative embodiments, the functionality of the variation determination system 105 and the content provider 107 shown in FIG. 1 is incorporated into client devices 102 as shown in FIG. 4. FIG. 4 is a block diagram of a variant testing system environment 400 according to another alternative embodiment. As shown in FIG. 4, environment 400 includes client devices 402 in communication with a third-party content provider 401 (hereinafter referred to as a "content provider 401") via network 109. In contrast to the embodiments shown in FIG. 1, the client devices 402 (e.g., client device 402A and client device 402B) include the functionality of the variation determination system 105 shown in FIG. 1. Thus, the client devices 102 determine which variation of a web page to request without consulting an external variation determination system as shown in the embodiment of FIG. 1.

In one embodiment, a client device 402 includes a variation determination module 403, a web browser 405, an experiment database 409, and a policy database 407. The components of the client devices 402 shown in FIG. 4 perform similar functionality as their respective components described above with respect to FIG. 1 and are omitted for ease of description.

For example, a client device 402A may receive a request from a user of the client device 402A for a web page from a content provider 300. The variation determination module 403A of client device 102A applies a function (e.g., MurmurHash3 function) to the user identifier of the client device 102 or to a concatenation of the user identifier and experiment identifier (e.g., retrieved from the experiment database 409A) of the requested web page to generate a hashed user identifier. The variation determination module 403A normalizes the hashed user identifier as described above to create an assignment identifier. The variation determination module 403A may select which variation of a web page should be displayed on the client device 402A according to the assignment identifier and the policy for the web page that is stored in the policy database 407A. The client device 402A requests the selected variation of the web page from the content provider 401 and receives the selection variation of the web page from the content provider 401.

Alternatively, variations of web pages or other content is already available on the client device 402A and the client device 402A displays the selected variation without requesting the variation from the content provider 401. For example, when the client device 402A requests a web page from the content provider 401 the content provider provides a baseline web page and instructions (e.g., JavaScript) that describes the different variations to apply to the baseline web page to the client device 402A. The client device 402 executes the instructions associated with the selected variation causing the client device 402 to modify the baseline web page in order to display the variation of the of the web page.

Note that although the embodiments described above are described in the context of variation testing of web pages, the described embodiments can be also applied in other contexts. For example, the embodiments herein are applicable to variation testing of native applications, or personalizing options for content items provided to users.

Providing Variations of Web Pages

Figure 5:
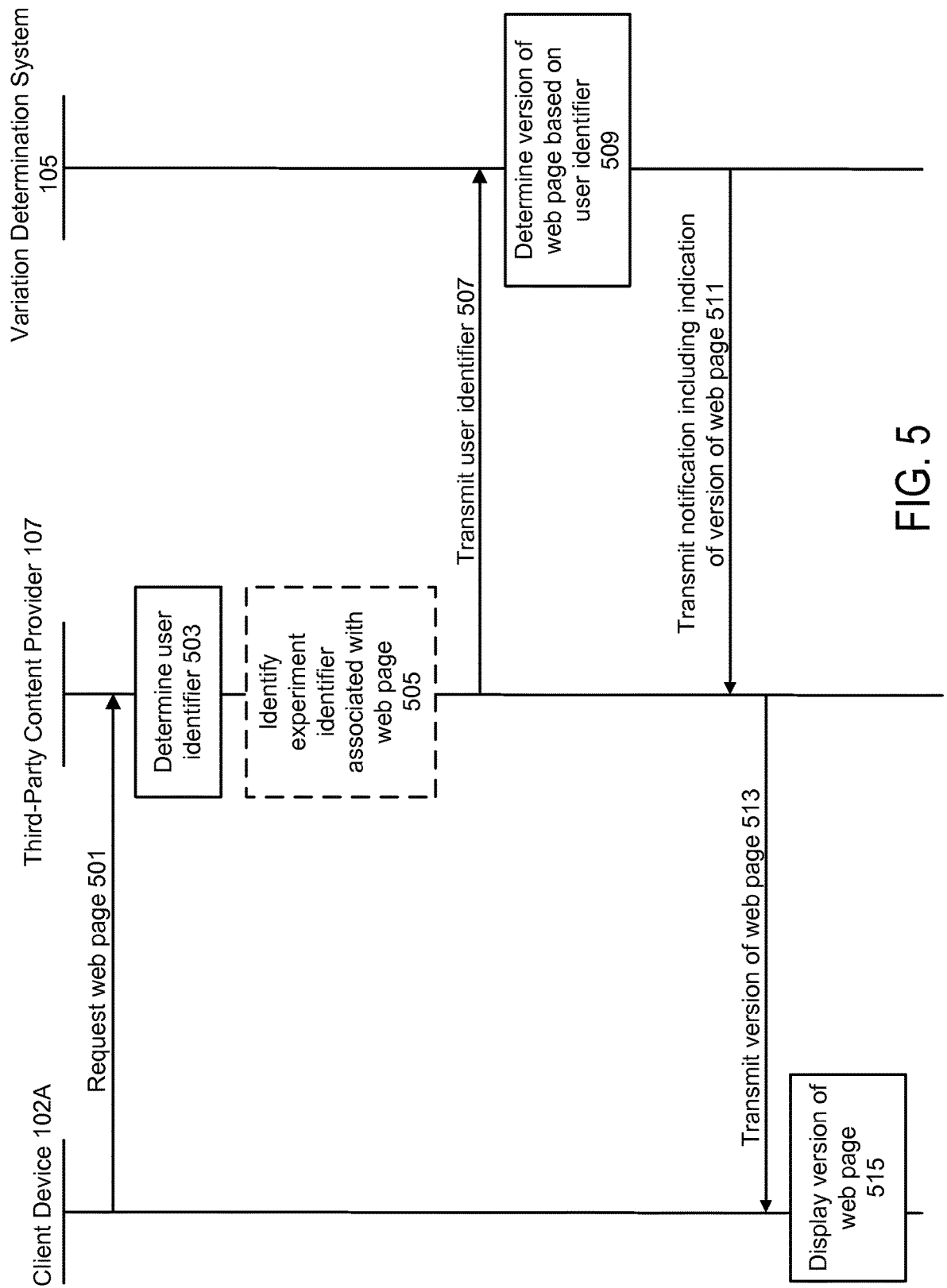
FIG. 5 is an interaction diagram of a process for providing a variation of a web page to a client device according to one embodiment.

FIG. 5 is an interaction diagram of a process for providing a variation of a web page to a client device 102A according to the embodiment shown in FIG. 1. The interaction diagram illustrates the steps performed by client device 102A, content provider 107, and variation determination system 105 according to one embodiment.

Client device 102A requests 501 a web page from content provider 107. The content provider 107 determines 503 a user identifier for the client device 102A. The user identifier for the client device 102A may be determined from the request for the web page that includes the user identifier. Alternatively, the content provider 107 may generate a user identifier for the user of client device 102A if a user identifier for the user has not been created. The content provider 106 may optionally identify 505 an experiment identifier associated with the web page. If the web page is associated with more than one experiment, the content provider 106 may optionally identifier an experiment identifier for each of the experiments associated with the web page. The experiment ID is an identifier of the variation test being conducted by the variation determination system 105 on the web page requested by the client device 102A.

The content provider 107 transmits 507 the user identifier to the variation determination system 105. The content provider 107 may also transmit the experiment identifier to the variation determination system 105. The variation determination system 105 determines 509 which variation of the web page should be provided to the client device 102A based on the user identifier. In some embodiments, the variation determination system 105 determines which variation of the web page should be provided to the client device 102 based on a concatenation of the user identifier and the experiment identifier. The variation determination system 105 transmits 411 a notification to the content provider 407 that includes an indication of the variation of the web page to provide to the client device 102A.

The content provider 106 transmits 513 the variation of the web page to the client device 102A based on the instructions provided by the variation determination system 105 and the client device 102A displays 515 the variation of the web page provided by the content provider 107.

Figure 6:
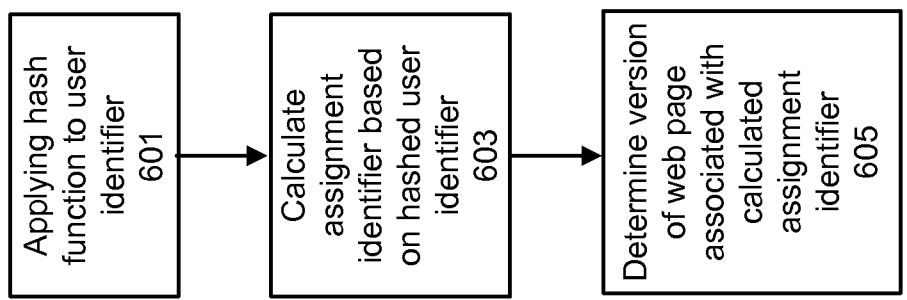
FIG. 6 is a method flow diagram for determining which variation of a web page to provide to a client device.

FIG. 6 illustrates one embodiment of a method used by the variation determination system 105 to determine which variation of a web page should be provided to the client device 102A based on the user identifier of the client device 102A. In one embodiment, the variation determination system 105 applies 601 a hash function to the user identifier to generate a hashed user identifier. Alternatively, the hash function may also be applied to a concatenation of the user identifier and experiment identifier. The hash function may be a deterministic, uniform and pseudorandom number generator such as the MurmurHash3 hash function. The variation determination system 105 calculates 603 an assignment identifier for the client device 102A by normalizing the hashed user identifier. The variation determination system 105 then determines 605 a variation of the web page that is associated with the assignment identifier.

For example, the variation determination system 105 may compare the assignment identifier to a policy for the web page that describes which variation of the web page to display based on the calculated assignment identifier. Since the user identifier for the client device 102A is used as the input for the function and is unique to the client device 102A, client device 102A will always see the same variation of the web page whenever the client device 102 requests the web page assuming the client device 102A maintains the same user identifier.

Figure 7:
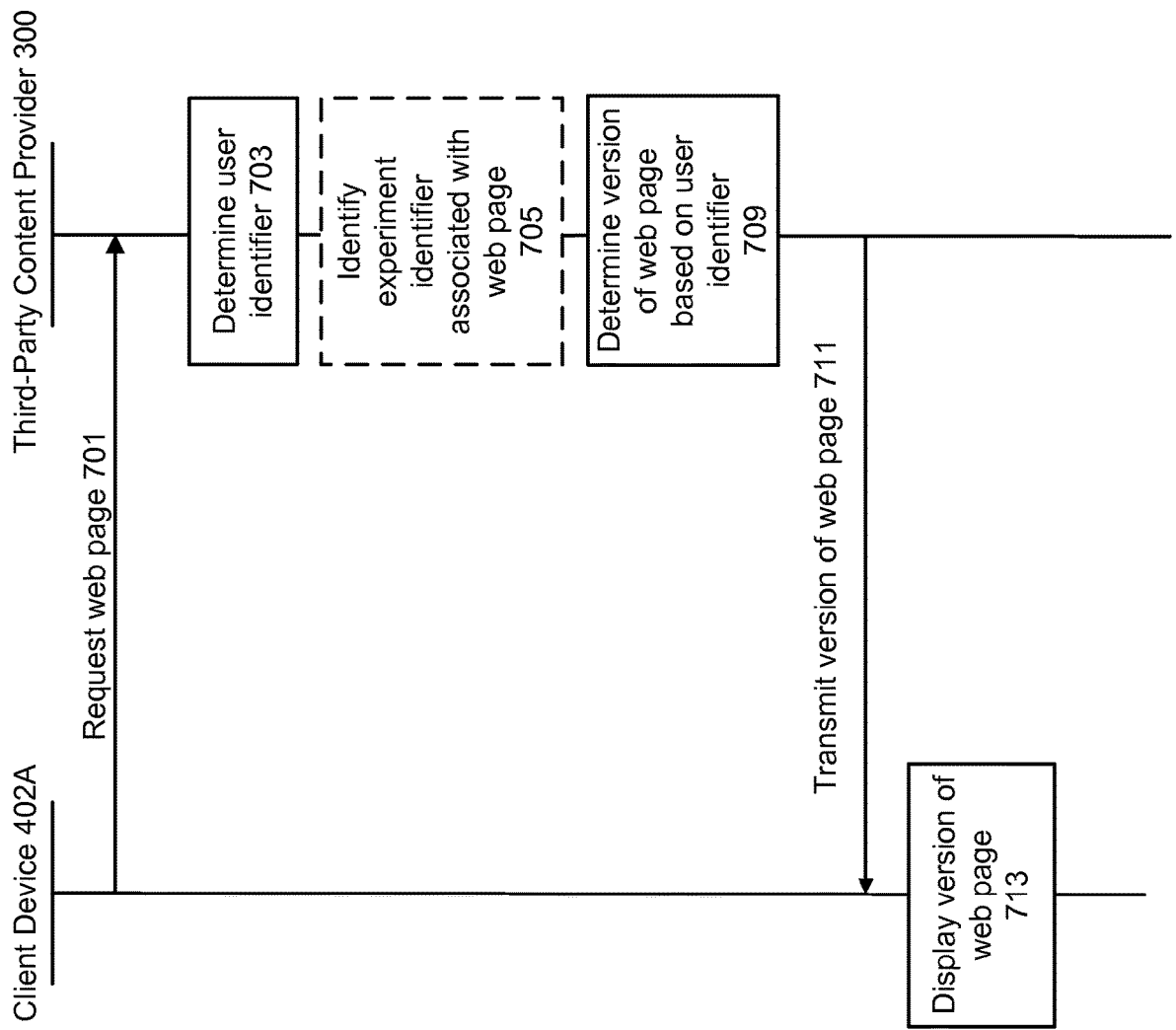
FIG. 7 is an interaction diagram of a process for providing a variation of a web page to a client device according to another embodiment.

FIG. 7 is an interaction diagram of a process for providing a variation of a web page to a client device 102A according to the embodiment shown in FIG. 3. The interaction diagram illustrates the steps performed by client device 102A and content provider 300 according to one embodiment.

Client device 102A requests 701 a web page from content provider 300. The content provider 300 determines 703 a user identifier for the client device 102A. The user identifier for the client device 102A may be determined from the request for the web page that includes the user identifier. Alternatively, the content provider 300 may generate a user identifier for the user of client device 102A if a user identifier for the user has not been created. The content provider 106 may optionally identify 705 an experiment identifier associated with the web page. In some embodiments, the variation determination system 105 determines which variation of the web page should be provided to the client device 102 based on a concatenation of the user identifier and the experiment identifier.

The content provider 300 determines 709 which variation of the web page should be provided to the client device 102A based on the user identifier (and optionally the experiment identifier). To determine which variation of the web page to provide to the client device 102A, the content provider 300 may perform the steps described above with respect to FIG. 5. The content provider 300 transmits 711 the determined variation of the web page to the client device 102A and the client device 102A displays 713 the variation of the web page provided by the content provider 107.

Figure 8:
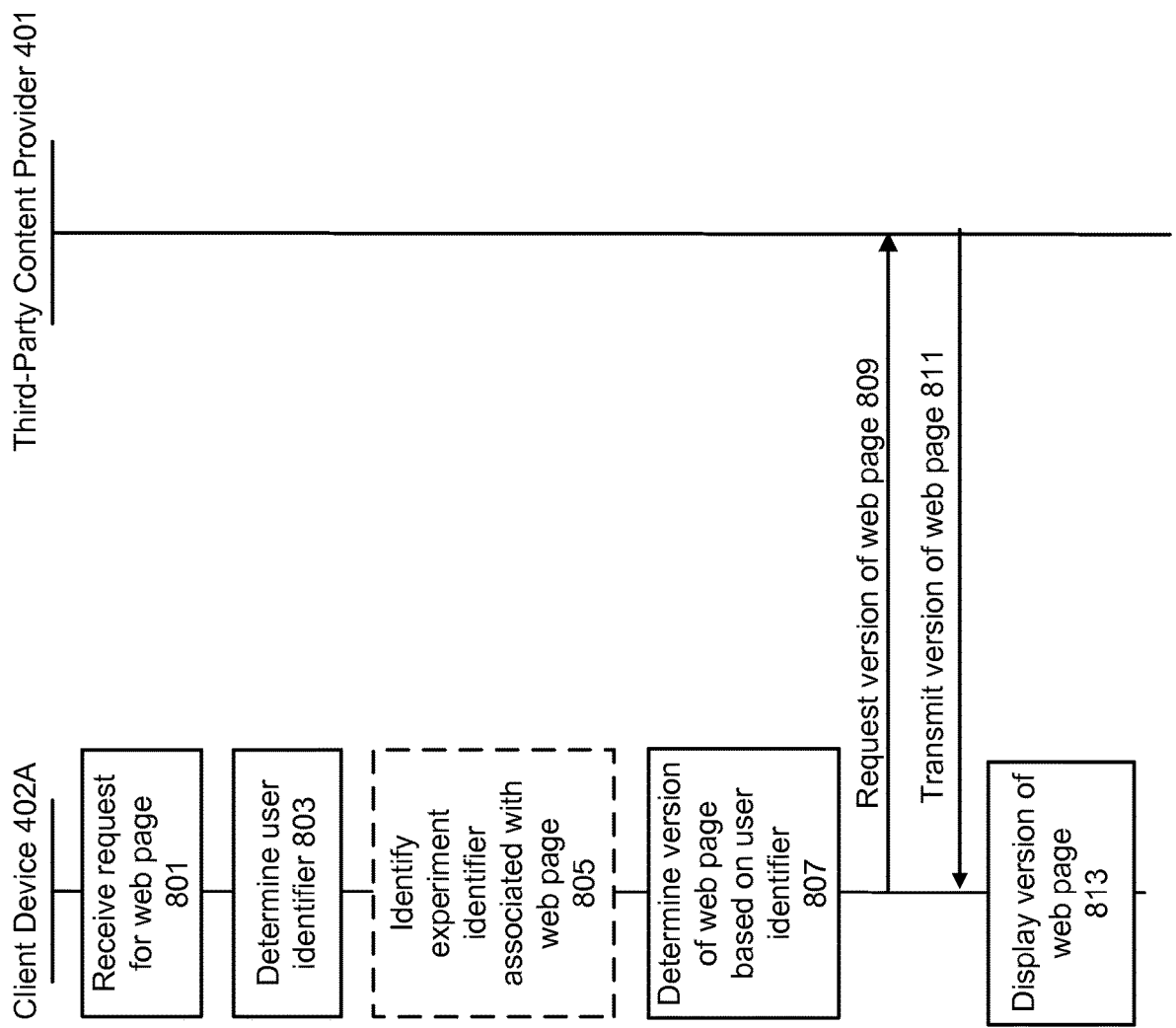
FIG. 8 is an interaction diagram of a process for providing a variation of a web page to a client device according to another embodiment.

FIG. 8 is an interaction diagram of a process for providing a variation of a web page to a client device 402A according to the embodiment shown in FIG. 4. The interaction diagram illustrates the steps performed by client device 402A and content provider 401 according to one embodiment.

Client device 402A receives a request for a web page from a user of the client device 402A. The client device 402A determines 803 a user identifier for the client device 102A. The user identifier for the client device 803 may be included in the request due to the user submitting the user identifier into a login form or the user identifier may be determined from a cookie stored on the web browser 405A of the client device 402A. The client device 402A may optionally identify 805 an experiment identifier associated with the web page. In some embodiments, the client device 402A determines which variation of the web page should be requested from the content provider 401 based on a concatenation of the user identifier and the experiment identifier.

The client device 402A determines 807 which variation of the web page should be requested from the content provider 401 based on the user identifier (and optionally the experiment identifier). To determine which variation of the web page to request, the client device 402A may perform one or more of the steps described above with respect to FIG. 5. The client device 402A transmits 809 a request for the determined variation of the web page to the content provider 401 and the content provider 401 transmits 811 the requested variation of the web page 811 to the client device 402A. The client device 402A displays 713 the variation of the web page provided by the content provider 107.

Additional Considerations

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method of determining a variation of a web page to provide to client devices of a user, the method comprising:

receiving, from an application of a first client device of a user, an indication of a request by the first client device for a web page, the web page associated with a plurality of different variations of the web page;

determining an identifier associated with a user of the first client device; applying a function to the identifier to generate an assignment identifier for the user; and wherein applying the function comprises:

generating a hash of the identifier using the function; and normalizing the hash of the identifier to generate the assignment identifier that is within an interval, wherein the assignment identifier and other assignment identifiers associated with other users are distributed within the interval based on a proportion of corresponding users assigned to each of the plurality of different variations;

selecting a variation of the web page from the plurality of different variations of the web page that corresponds to the assignment identifier for the user; and receiving, from an application of a second client device of the user that is a different client device type from the first client device of the user, an indication of a request by the second client device for the same web page requested by the first client device;

wherein the same selected variation of the web page is provided to both the first client device of the user and the second client device of the user.

2. The computer-implemented method of claim 1, wherein the function applied to the identifier is a deterministic, uniform and pseudorandom number generator.

3. The computer-implemented method of claim 2, further comprising: determining an identifier associated with a variation test for the web page that includes the plurality of different variations of the web page.

4. The computer-implemented method of claim 3, wherein applying the function comprises:

applying the deterministic, uniform and pseudorandom generator to a concatenation of the identifier and the identifier associated with the variation test for the web page to generate the hash of the identifier.

5. The computer-implemented method of claim 4, wherein selecting the variation of the web page comprises:

identifying a policy for the web page that describes which variation of the web page to provide based on assignment identifiers;

comparing the assignment identifier to the policy; and selecting the variation of the web page to provide in response to receiving the identifier based on the comparison.

6. The computer-implemented method of claim 5, wherein the plurality of different variations of the web page comprise only a first variation of the web page and a second variation of the web page, and the policy includes a threshold indicative of whether to provide the first variation or the second variation in response to receiving the identifier, and wherein comparing the assignment identifier to the policy comprises:

comparing the assignment identifier to the threshold;

responsive to the assignment identifier being below the threshold, selecting the first variation of the web page to provide in response to receiving the identifier; and responsive to the assignment identifier being above the threshold, selecting the second variation of the web page to provide in response to receiving the identifier.

7. The computer-implemented method of claim 5, wherein comparing the assignment identifier to the policy comprises:

identifying, from the policy, a mapping of a plurality of ranges of assignment identifiers to the plurality of variations of the web page, each range of assignment identifiers associated with a different variation of the web page;

identifying a range of assignment identifiers from the plurality of ranges of assignment identifiers that includes the assignment identifier; and identifying a variation of the web page that is associated with the identified range of assignment identifiers.

8. The computer-implemented method of claim 1, wherein receiving the indication of the request by the first client device for the web page comprises:

receiving, from a content provider, the identifier, wherein the content provider receives the request for the web page from the first client device.

9. The computer-implemented method of claim 1, wherein providing the selected variation of the web page comprises:

transmitting one or more notifications to the content provider, the one or more notifications each including an indication of the selected variation of the web page to provide to the first client device and the second client device;

wherein the content provider provides the selected variation of the web page to the first client device and the second client device based on the notification.

10. The computer-implemented method of claim 1, wherein receiving the indication comprises:

receiving, by a computer system, the request by the first client device for the web page.

11. The computer-implemented method of claim 1, wherein the application is a web browser of the first client device and the first client device selects the variation of the web page.

12. A computer program product comprising a non-transitory computer-readable storage medium storing executable code of determining a variation of a web page to provide to client devices of a user, the code when executed causing a computer to perform operations comprising:

receiving, from an application of a first client device of a user, an indication of a request by the first device for a web page, the web page associated with a plurality of different variations of the web page;

determining an identifier associated with a user of the first client device;

applying a function to the identifier to generate an assignment identifier for the user;

wherein applying the function comprises:

generating a hash of the identifier using the function; and normalizing the hash of the identifier to generate the assignment identifier that is within an interval, wherein the assignment identifier and other assignment identifiers associated with other users are distributed within the interval based on a proportion of corresponding users assigned to each of the plurality of different variations;

selecting a variation of the web page from the plurality of different variations of the web page that corresponds to the assignment identifier for the user; and receiving, from an application of a second client device of the user that is a different client device type from the first client device of the user, an indication of a request by the second client device for the same web page requested by the first client device;

wherein the same selected variation of the web page is provided to both the first client device of the user and the second client device of the user.

13. The computer program product of claim 12, wherein the function applied to the identifier is a deterministic, uniform and pseudorandom number generator.

14. The computer program product of claim 13, wherein the code when executed by the computer further causes the computer to perform steps comprising:

determining an identifier associated with a variation test for the web page that includes the plurality of different variations of the web page; and applying the deterministic, uniform and pseudorandom-generator to a concatenation of the identifier and the identifier associated with the variation test for the web page to generate the normalized hash of the identifier.

15. The computer program product of claim 14, wherein selecting the variation of the web page comprises:

identifying a policy for the web page that describes which variation of the web page to provide based on assignment identifiers;

comparing the normalized assignment identifier to the policy; and selecting the variation of the web page to provide in response to receiving the identifier based on the comparison.

16. The computer program product of claim 15, wherein the plurality of different variations of the web page comprise only a first variation of the web page and a second variation of the web page, and the policy includes a threshold indicative of whether to provide the first variation or the second variation in response to receiving the identifier, and wherein comparing the generated assignment identifier to the policy comprises:

comparing the assignment identifier to the threshold;

responsive to the assignment identifier being below the threshold, selecting the first variation of the web page to provide in response to receiving the identifier; and responsive to the assignment identifier being above the threshold, selecting the second variation of the web page to provide in response to receiving the identifier.

17. The computer program product of claim 15, wherein comparing the assignment identifier to the policy comprises:

identifying, from the policy, a mapping of a plurality of ranges of assignment identifiers to the plurality of variations of the web page, each range of assignment identifiers associated with a different variation of the web page;

identifying a range of normalized assignment identifiers from the plurality of ranges of assignment identifiers that includes the assignment identifier; and identifying a variation of the web page that is associated with the identified range of assignment identifiers.

18. The computer program product of claim 12, wherein providing the selected variation of the web page comprises:

transmitting one or more notifications to the content provider, the one or more notifications each including an indication of the selected variation of the web page to provide to the first client device and the second client device;

wherein the content provider provides the selected variation of the web page to the first client device and the second client device based on the notification.

19. A computer system of determining a variation of a web page to provide to client devices of a user, the computer system comprising:

a computer processor;

a non-transitory computer-readable storage medium storing executable code, the code when executed by the computer processor causes the computer processor to perform operations comprising:

receiving, from an application of a first client device of a user, an indication of a request by the first client device for a web page, the web page associated with a plurality of different variations of the web page;

determining an identifier associated with a user of the first client device;

applying a function to the identifier to generate an assignment identifier for the user;

wherein applying the function comprises:

generating a hash of the identifier using the function; and normalizing the hash of the identifier to generate the assignment identifier that is within an interval, wherein the assignment identifier and other assignment identifiers associated with other users are distributed within the interval based on a proportion of corresponding users assigned to each of the plurality of different variations;

selecting a variation of the web page from the plurality of different variations of the web page that corresponds to the assignment identifier for the user; and receiving, from an application of a second client device of the user that is a different client device type from the first client device of the user, an indication of a request by the second device from the same web page requested by the first client device;

wherein the same selected variation of the web page is provided to both the first client device of the user and the second client device of the user.

* * * * *